United States Patent
Anschutz

(10) Patent No.: US 11,021,852 B2
(45) Date of Patent: Jun. 1, 2021

(54) METHOD FOR CONTROLLING A CURRENT DISTRIBUTION, CONTROL DEVICE FOR RUNNING SAID METHOD AND CURRENT SHARING SYSTEM

(71) Applicant: Guangxi LiuGong Machinery Co., Ltd., Guangxi (CN)

(72) Inventor: Andrew Anschutz, Parkville, MO (US)

(73) Assignee: Guangxi LiuGong Machinery Co., Ltd., Guangxi (CN)

( * ) Notice: Subject to any disclaimer, the term of this patent is extended or adjusted under 35 U.S.C. 154(b) by 0 days.

(21) Appl. No.: 16/689,522

(22) Filed: Nov. 20, 2019

(65) Prior Publication Data

US 2021/0062469 A1 Mar. 4, 2021

(30) Foreign Application Priority Data

Aug. 26, 2019 (WO) ................ PCT/CN2019/102572

(51) Int. Cl.
*E02F 9/20* (2006.01)
*H02P 5/50* (2016.01)
*B60L 15/20* (2006.01)
*B60K 25/00* (2006.01)

(52) U.S. Cl.
CPC .............. *E02F 9/207* (2013.01); *B60L 15/20* (2013.01); *H02P 5/50* (2013.01); *B60K 25/00* (2013.01); *H02P 2205/05* (2013.01)

(58) Field of Classification Search
CPC ............................. H02P 5/50; H02P 2205/05
USPC .............................................. 318/99, 98, 34
See application file for complete search history.

(56) References Cited

U.S. PATENT DOCUMENTS

| 6,745,117 B1 | 6/2004 | Thacher et al. |
| 7,466,087 B2 * | 12/2008 | Musser .................. B60W 20/11 318/53 |
| 8,120,203 B2 * | 2/2012 | Heineman ........... H02M 3/1584 307/32 |

(Continued)

FOREIGN PATENT DOCUMENTS

EP 2815946 A1 12/2014

OTHER PUBLICATIONS

Extended Europe Seach Report in corresponding European Patent Application 19210329, dated Sep. 9, 2020, 11 pgs.

*Primary Examiner* — David Luo
(74) *Attorney, Agent, or Firm* — Young Basile Hanlon & MacFarlane, P.C.

(57) ABSTRACT

A method for controlling a current distribution between multiple electric motor devices in a current sharing system of an electrically driven construction machine is described. The method comprises estimating a first current demand for a first electric motor device powered by a battery system and estimating a second current demand for a second electric motor device powered by the battery system. The method comprises determining an available amount of current available in the current sharing system. The method comprises splitting the available amount of current into a first portion for driving the first electric motor device and a second portion for driving the second electric motor device. The splitting is based on the estimations of the first current demand and the second current demand. A control device configured to run the method and to run a current sharing system for an electrically driven construction machine is also described.

17 Claims, 4 Drawing Sheets

(56) References Cited

U.S. PATENT DOCUMENTS 9,032,725 B2 * 5/2015 Filla ..................... E02F 9/2253
60/431
10,498,130 B2 * 12/2019 Handy ................... H02H 3/025

* cited by examiner

METHOD FOR CONTROLLING A CURRENT DISTRIBUTION, CONTROL DEVICE FOR RUNNING SAID METHOD AND CURRENT SHARING SYSTEM

Related Applications

This application claims priority to International Application No. PCT/CN2019/102572, filed Aug. 26, 2019, which is incorporated herein in its entirety by reference.

TECHNICAL FIELD

The invention concerns a method for controlling a current distribution between multiple electric motor devices in a current sharing system of an electrically driven construction machine. The invention further concerns a control device for controlling a current distribution in a current sharing system of an electrically driven construction vehicle. The invention also concerns a current sharing system for an electrically driven construction machine.

PRIOR ART

Electrically driven construction machines may have multiple energy consumers, which are powered by electric motor devices. These electric motor devices are supplied by a current in a current sharing system. The individual demand of each electric motor device may vary strongly with time.

The prior art document U.S. Pat. No. 9,032,725 B2 relates to a method for operating a working machine provided with an internal combustion engine as power source. Torque commands to sub-systems as well as the RPM of the according sub-systems are fed to a torque control-unit. The torque control unit calculates a power demand of each sub-system and instructs a summation point, such as a flywheel, to distribute the power available. Furthermore, EP 2 815 946 B1 relates to a system for controlling a power distribution in an operating condition, in which the traveling direction of an electrically driven construction machine is changed from forward to reverse or the other way around.

SUMMARY OF THE INVENTION

The present invention is directed to a method for controlling a current distribution between multiple electric motor devices in a current sharing system of an electrically driven construction machine.

The electrically driven construction machine may be a construction machine, which is exclusively driven by electric energy. Alternatively, the construction machine may comprise a hybrid drive. Such electrically driven construction machines could be battery wheel loaders, battery skid loaders, battery excavators, battery graders, or arbitrary others.

The method according to the present invention comprises a step of estimating a first current demand of a first electric motor device powered by a battery system and estimating a second current demand of a second electric motor device powered by the battery system. The method may further comprise a step of estimating a third current demand of a third electric motor device or a fourth or several further current demands of other electric motor devices, respectively. Thus, the concept of controlling a current distribution between multiple electric motor devices in a current sharing system of an electrically driven construction machine may be applied to a system of several, e.g. more than two, electric motor devices. In the present disclosure, the term estimating may be distinguished from the term measuring. Estimations may be at least partly based on assumptions and/or approximations. Therefore, estimations may require less effort than precise measurements. An electric motor device according to this disclosure may comprise a single electric motor or multiple electric motors. The same applies to the term battery system, which may comprise a single electric battery or multiple electric batteries. The battery system may further comprise a battery control device. The current demand of the electric motor device may be seen as the current which is, according to the estimations, required by the respective electric motor device in order to output the requested power.

The method according to the present invention further comprises a step of determining an available amount of current available in the current sharing system. Said available amount of current may vary with time, e.g. depend on a battery state and an operating condition of the construction machine. The determining may be performed by a calculation which may take a parasitic current used by the current sharing system into account. The parasitic current may be any current that cannot be measured and is therefore calculated from measured values in the current sharing system.

The method according to the present invention further comprises a step of splitting the available amount of current into a first portion for driving the first electric motor device and a second portion for driving the second electric motor device, wherein the splitting is based on the estimations of the first current demand and the second current demand. The method may further comprise a step of further splitting the available amount of current into a third portion for driving the third electric motor device or other portions for driving the other electric motor devices, respectively, wherein the splitting is based on the estimations of the third current demand or the other current demands. The first portion and the second portion are shares of the available amount of current. So are the third and the further portions. The sum of the different portions may equal, depending on the operational condition, the available amount of current.

As the inventive method is based on the estimations of the first current demand and the second current demand and if applicable of the further current demands, it can be performed without the need for either an excessive computing power or for precise measurements of certain parameters, such as torques. The demand of the different electric motor devices may change rapidly. Also, the limits imposed by the battery system may be very strict. As the estimations can be performed rapidly, the inventive method is capable of performing a splitting of current, which meets the varying demands in an accurate and dynamic way. Thus, it is possible to efficiently split the available amount of current in accordance with the present power demand of each electric motor device. In other words, the invention satisfies the rapidly changing individual demands of the electric motor devices on the one hand, while, on the other hand, it ensures that over discharge of the battery system is prevented, and the limits imposed by the battery system are kept. Thus, parallel discharge, i.e. discharging the battery system for at least two electric motor devices simultaneously, is rendered possible. In the present situation, parallel discharge is an important effect because the discharge of the first electric motor device and the discharge of the second electric motor device and if applicable of the further current demands may have the same priority.

In one embodiment, the method may comprise the steps of: Receiving a first torque command commanded to the first electric motor device and a second torque command commanded to the second electric motor device. Said receiving may comprise a reading and/or a converting of the torques commanded to the respective electric motor device. Further, measuring a first speed of the first electric motor device and a second speed of the second electric motor device may be performed. Said speeds may be the RPM outputs of the respective motor devices during a specific time. In said embodiment, the estimation of the first current demand may be based on the first torque command and the first speed, preferably based on a multiplication of the first torque command and the first speed, and the estimation of the second current demand may be based on the second torque command and the second speed, preferably based on a multiplication of the second torque command and the second speed. A multiplication of the respective torque command and the respective speed, and a division by the battery voltage available in the battery system, may lead to a reasonable accuracy of the actual current demand of the respective motor. This embodiment thus allows for an efficient estimation of the current demands of the motors, even in the dynamically changing environment of the presently disclosed current sharing system. As previously disclosed, the inventive concept may be applied to a system of several electric motor devices without deviating from the invention. For the sake of conciseness, the following disclosure focusses on a system with two electric motor devices, which in turn may comprise a single electric motor or multiple electric motors.

In another embodiment, the splitting may comprise a first step which determines whether the available amount of current is greater than, equal to or less than a predetermined minimum amount of current, wherein the result of said determination is used for the further splitting. The predetermined minimum amount of current can be preset according to the individual requirements of the current sharing system. It may be preset by the manufacturer of the machine and/or by the operator. It is also possible that the predetermined minimum amount is adjustable, e.g. by the operator. It is thus rendered possible to efficiently split the current and simultaneously to prevent the system from damage in case the current demanded exceeds or falls below the predetermined minimum amount of current. Thus, in order to protect the battery system and the entire current sharing system from damage, over discharge of the battery can be prevented by using the result of the determination for the further splitting.

In a further embodiment, the further splitting may be performed as follows: In case the available amount of current is less than the predetermined minimum amount of current, in the first step, the available amount of current may be split into the first portion and the second portion in a first predetermined ratio of preferably 2 to 1, meaning that two thirds of the available amount of current are assigned to the first portion feeding the first electric motor device and that one third of the available amount of current is assigned to the second portion feeding the second electric motor device. In case the available amount of current is greater than or equal to the predetermined minimum amount of current, in the first step, an amount of current, which equals a predetermined first minimum current, is assigned to the first portion, and an amount of current, which equals a predetermined second minimum current, is assigned to the second portion. The first and second minimum amounts of current can be preset according to the individual requirements of the respective electric motor device. They may be adjustable, e.g. by the operator of the machine.

Therefore, in case the predetermined minimum amount of current is available, each electric motor device gets the individual minimum amount of current required for maintaining a minimum load. Thus, in this embodiment it is ensured that instead of assigning the current to only one of the electric motor devices, each motor device simultaneously receives its minimum amount of current which may be constant over time. Therefore, a basic current supply for each electric motor device is ensured. In the first step, the first and the second motor device may be equally prioritized.

In a further embodiment, the splitting may comprise a second step, which determines whether a first remaining current of the available amount of current remaining after the first step is greater than, equal to or less than a total amount of demanded current remaining after the first step, wherein the result of said determination is used for the further splitting. The first remaining current equals the amount of current which remains after the predetermined minimum amounts of current of the individual electric motors have been subtracted from the available amount of current. After the highest priority of ensuring a constant basic supply in the first step, the second step may distribute the current according to the individual, time-varying demands. In the second step, each motor device may receive the individual amount of current assigned to the respective motor device simultaneously. Parallel satisfaction of the respective current demand of the first and the second electric motor device is therefore possible.

In a further embodiment, the further splitting may be performed as follows: In case the first remaining current of the available amount of current is less than the total amount of demanded current remaining after the first step, in the second step, the first remaining current of the available amount of current is spilt into the first portion and the second portion in a ratio equaling the ratio of the first current demand to the second current demand. That means that one electric motor device receives an amount of current depending on its demand relatively to the other electric motor device. For instance, if the first motor device demands for 80% of the available amount of current and the second motor device demands for 20% of the available amount of current, each electric motor device receives its minimum current in the first step. Then, in the second step, the first motor device would receive 80% of the first remaining current in said example while the second motor device would receive 20% of the first remaining current. Thus, each electric motor device receives current according to its relative demand. In case the first remaining current of the available amount of current is greater than or equal to the total amount of demanded current remaining after the first step, in the second step, a first current is assigned to the first portion up to the first current demand, and a second current is assigned to the second portion up to the second current demand. In such a case, both electric motor devices receive their entire demand parallelly. In this case, after the second step, the first portion equals the first current demand and the second portion equals the second current demand. The demands of both electric motor devices are therefore fully satisfied. By performing the second step and the according current assignment after the first step, it is ensured that each electric motor device receives an optimal current in view of the available amount of current. In the second step, the first and the second motor device are equally prioritized, too. Thus, operation of the electrically driven construction machine can be maintained in any stage with view to its driving and its working as any electric motor device receives a reasonable amount of current even if the total demand cannot be satisfied.

In a further embodiment, the splitting may comprise a third step which determines whether after the second step, a second remaining current of the available amount of current remaining after the second step is greater than zero. The second remaining current may equal the difference between the available amount of current in the first place and the demanded currents, which are time varying. In case the second remaining current of the available amount of current is greater than zero, in said third step, the second remaining current of the available amount of current may be split into the first portion and the second portion in the first predetermined ratio, which is known from the first step. Said splitting in the third step is thus only performed in case each electric motor device has received its demanded current, and there is still current left in the current sharing system. Thus, even if current is remaining in the current sharing system after each electric motor device has received its demanded current, an additional current may be split between the electric motor devices. Also, the current assigned to the respective electric motor device may, in a further embodiment, be adjusted in order not to exceed a maximum current for each electric motor device. Said maximum current may be preset. The maximum current may further be varying with the respective operational condition of each electric motor device.

In a further embodiment, the method may further comprise the steps of: Estimating a lead current demand for a lead motor which forms part of the first electric motor device and estimating a follow current demand for a follow motor, which forms part of the first electric motor device. Further, receiving the amount of current of the first portion may be performed. The first portion may be finally determined either after the first, or the second, or the third step, as disclosed in conjunction with the other embodiments. The amount of current, which is assigned to the first portion or, in other words, the amount of current carried by the first portion, may depend on the available current in the system and the respective time varying demands. Sub-splitting the first portion into a lead portion for driving the lead motor and a follow portion for driving the follow motor, based on the estimations of the lead current demand and the follow current demand, may be performed. The demands of the lead and follow motors may be estimated according to the procedures of the present disclosure. In this sub-splitting, the lead current demand may be based on the lead torque command and the measured lead speed and the follow current demand may be based on the follow torque command and the measured follow speed. By using the torque commands and the measured speeds for determining the current demand, the aforementioned advantages of said approach are unfolded for the present sub-routine.

In a further embodiment, the sub-splitting may comprise a first sub-step which determines whether the first portion is greater than, equal to or less than the predetermined first minimum current. While the previously disclosed step of splitting determines whether the predetermined minimum amount of current for all the electric motor devices is available, the presently disclosed step of sub-splitting may exclusively take the predetermined first minimum current for the first electric motor device into account. Thus, it is possible to efficiently split the current of the first portion, or in other words, carried by the first portion and simultaneously to prevent the system from damage in case the current demanded exceeds or falls below the predetermined first minimum current. The predetermined first minimum current depends on the respective lead motor and follow motor and their properties. Thus, in order to protect the battery system and the entire current sharing system from damage, over discharge of the battery can be prevented by using the result of the determination for the further sub-splitting. In case the first portion is less or accordingly contains less current than the predetermined first minimum current, in the first sub-step, the first portion is split into the lead current and the follow current in a second predetermined ratio of preferably 1 to 1. The second predetermined ratio may be different from the first predetermined ratio. In case the first portion is greater than or equal to the predetermined first minimum current, in the first sub-step, a lead current minimum demand is assigned to the lead portion and a follow current minimum demand is assigned to the follow portion, wherein the lead current minimum demand and the follow current minimum demand preferably have the same value. Hence, the lead motor and the follow motor are firstly fed with their respective minimum demands. This again prevents any damage to the system. Also, efficient sub-splitting is ensured by first feeding the respective minimum currents. In the first sub-step, current distribution between the first electric motor and the second electric motor is performed parallelly.

In another embodiment, the sub-splitting may comprise a second sub-step, which determines whether a minimum remaining current of the first portion remaining after the first sub-step is greater than zero. Said second sub-step may therefore indirectly determine whether the first portion is larger than, equal to or less than the predetermined first minimum current. In case the minimum remaining current of the first portion is greater than zero, a portion of the minimum remaining current of the first portion is assigned to the lead portion until the lead current demand is reached. In other words, if the first portion is large enough to satisfy the respective minima of the lead motor and the follow motor, the current is assigned to the lead motor first, i.e. until the lead motor receives its demanded current. Thus, the lead motor receives its entire demanded current before the follow motor receives any current. In the second sub-step, the lead motor is therefore prioritized over the follow motor because the lead motor is more important for the construction machine's driving mechanism than the follow motor, for example. In the second sub-step, the presently disclosed method applies a sequential current distribution.

In a further embodiment, the sub-splitting may comprise a third sub-step, which determines whether a lead remaining current remaining after the second sub-step is greater than zero. Said third sub-step is thus only performed if the lead current demand is fully satisfied. In case the lead remaining current is greater than zero, a portion of the lead remaining current is assigned to the follow portion until the follow current demand is reached. In other words, after the lead current demand is fully satisfied, the current left is given to the follow motor until the follow current demand is satisfied, too. Consequently, the lead and the follow current demand are, after their respective minimum is assigned to them, distributed sequentially as the lead motor has a higher priority. In the second and the third sub-step, a waterfall principle for current distribution may be applied.

The sub-splitting may further comprise a fourth sub-step which determines whether a follow remaining current remaining after the third sub-step is greater than zero. In other words, the method determines whether there is still current left when the follow portion meets the follow current demand. In case the follow remaining current is greater than zero, the follow remaining current is split into the lead portion and the follow portion in the second predetermined ratio. Thus, even if current is remaining in the current sharing system after the lead motor and the follow motor have received their demanded current, an additional current may be split between those two motors. Also, the current assigned to the respective electric motor can, in a further embodiment, be adjusted in order not to exceed a maximum current for the lead motor and the follow motor. Said maximum current may be preset and/or adjustable, e.g. by the operator. The maximum current may further be dependent on the respective operational condition of the lead motor and the follow motor.

The method according to the present invention may be carried out more than once, preferably more than 50 times, further preferably between 80 and 100 times, per second. Thus, the step of estimating current demands and assigning current portions according to said estimations may be performed in a continuously running manner. Continuous estimating may be achieved in a reliable manner as the inventive estimations are performed rapidly. A continuous adjustment of current distribution ensures that the current demand and the available amount of current are matched to one another throughout the entire operational period of the construction machine.

In a further embodiment, the method may run through the steps of estimating (a.), determining (b.), and splitting (c.) chronologically and may further preferably restart at step a. once the method is carried out. This further supports the continuously running manner of the method.

In the method according to the present invention, the available amount of current available in the current sharing system may equal the maximum amount of current available for discharge from the battery system plus an estimated regenerated current from at least one of the first electric motor device and the second electric motor device. Regeneration may be estimated with an efficiency of 80%. Thus, the current sharing system's efficiency, or accordingly the efficiency of the disclosed method, is further increased by not only using the power from battery discharge, but also using the power resulting from the construction machine's potential and/or kinetic energy that is converted into current.

The method may further comprise an initializing step, which sets maximum limits for the first portion and the second portion which are not to be exceeded. Said maximum limits may be set directly by limiting the current in a motor control unit (MCU) which is assigned to the respective electric motor device. Said maximum limits may also be set indirectly by limiting a first maximum torque command and a second maximum torque command which are not to be exceeded. Said maximum torque command may be set in a vehicle control unit (VCU). The maximum torque commands may be preset or may be depending on the present operational condition. It may thus be possible to perform the function for current limiting in the VCU instead of the respective MCU. In such a case, once the maximum currents are determined, the VCU may convert those values for the maximum currents back into a maximum torque at the given speed of the electric motor device. The maximum torque limit may be set by the MCU, or the VCU may limit its torque commands to the MCU. The current sharing system's safety and steadiness may be increased by setting these maxima in the initializing step. The method may further comprise an overheating prevention step which calculates a system maximum current. The system maximum current is the maximum current which the current sharing system's current lines can transmit. Said overheating prevention step increases the method's safety. The method may further comprise the step of calculating a parasitic current in the current sharing system based on measured parameters. Knowing the parasitic current helps determining the available amount of current in a more accurate way.

The present invention is further directed to a control device for controlling a current distribution in a current sharing system of an electrically driven construction vehicle. Said control device is configured to run the method according to one of the above described embodiments. A control device configured to run a certain method is specifically adapted, e.g. programmed, to run said method.

Also, the invention concerns a current sharing system for an electrically driven construction machine. The current sharing system may comprise a power distribution bus which is capable of distributing the current available in the current sharing system from a power input, such as a battery system, to the respective power output, such as electric motor devices. Said current sharing system has the following components: A battery system including at least one battery. The term battery may concern an electric battery comprising at least one electrochemical cell. The current sharing system further has a first electric motor device, preferably an electric ground drive, which further preferably comprises a lead motor and a follow motor. The electric ground drive drives the construction machine. The ground drive may comprise a lead motor and a follow motor, which may be located at different positions in the electrically driven construction vehicle. The current sharing system may further comprise a lead motor control unit, which is operatively connected to the lead motor, and a follow motor control unit, which is operatively connected to the follow motor. The lead motor control unit may be capable of sending signals to and receiving signals from the lead motor, the follow motor control unit may be capable of sending signals to and receiving signals from the follow motor. The lead motor control unit and the follow motor control unit may be seen as a first motor control unit, which is operatively connected to the first motor device. Hence, the first motor control unit may comprise a lead motor control unit and a follow motor control unit. The first motor control unit may be capable of sending signals to and receiving signals from the first electric motor device in order to control said motor. The current sharing system further comprises a second electric motor device, preferably an electric pump motor for a hydraulic pump. The second electric motor device provides the output power required to perform the respective purpose of the construction machine. E.g., for a battery wheel loader, the second electric motor may be the electric pump motor for the hydraulic pump, which provides the hydraulic pressure for moving the respective front attachment, such as a bucket. The current sharing system further comprises a second motor control unit, which is operatively connected to the second motor device. The second motor control unit may be capable of sending signals to and receiving signals from the second electric motor device in order to control said motor.

The current sharing system further comprises a vehicle control unit (VCU) which is capable of sending signals to and receiving signals from the motor control units and other control units of the electrically driven construction machine. The VCU may be further operatively connected to the individual input supplied by an operator of the current sharing system for the electrically driven construction machine. The VCU comprises a control device according to the above embodiment, which control device is operatively connected to the vehicle control unit, the battery system, the first motor control unit and the second motor control unit. The control device can be seen as a sub-system of the VCU, which sub-system runs the method of this disclosure. The current sharing system may further comprise a third or further electric motor devices. The third or the other electric motor devices may provide an additional output power. The current sharing system further comprises a third or further motor control units, which may be operatively connected to the third or the further motor devices, respectively. The third or the further motor control units may be capable of sending signals to and receiving signals from the third or the further electric motor devices, respectively, in order to control said motor.

By incorporating the inventive control device or current sharing system into an electrically driven construction machine, the advantages of the inventive method extend to the electrically driven construction machine.

In a further embodiment of the current sharing system according to the invention, the first electric motor device is equipped with a first current limiter and the second electric motor device is equipped with a second current limiter. Further, the third electric motor may be equipped with a third current limiter, and so on. These current limiters ensure that the current fed to the respective electric motor device does not exceed the respective maxima. In other words, the current limiters may be adapted to each limit a maximum current which can be supplied to the according motor devices. Said first and second current limiters are capable of applying the maximum limits for the first portion and the second portion which are determined in the previously disclosed initializing step.

In a further embodiment, the current sharing system may comprise at least one fuse in its current lines. Said at least one fuse may use an i2t algorithm in order to determine the system maximum current. The fuse raises the current sharing system's operational safety.

DETAILED DESCRIPTION OF EMBODIMENTS

Embodiments of the present invention are subsequently described with reference to the attached FIGS. 1 to 6.

Figure 1:
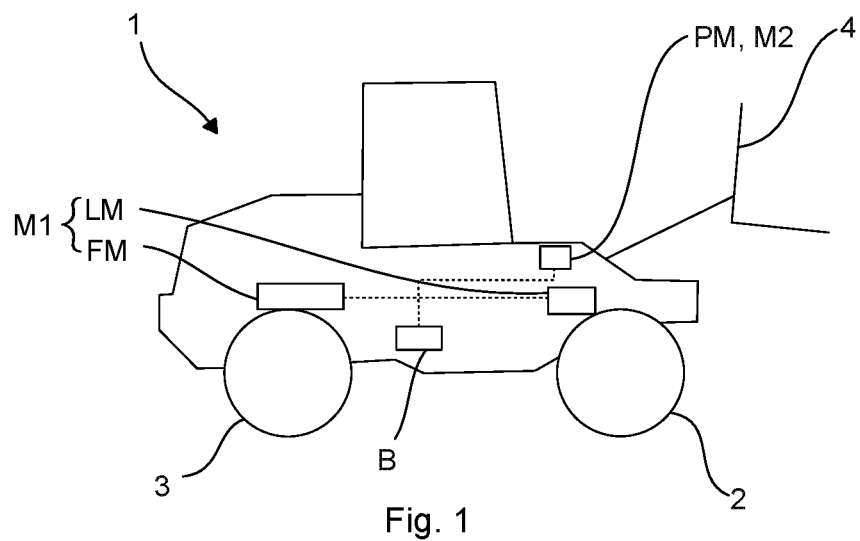
FIG. 1 shows a schematic view of a battery wheel loader according to an embodiment of the present invention.

FIG. 1 shows a battery wheel loader 1 as electrically driven construction machine. A lead motor LM begins to apply torque to a pair of front wheels 2 and a pair of rear wheels 3. All four wheels 2, 3 of the battery wheel loader 1 are therefore driven simultaneously. When a certain torque threshold is reached, a follow motor FM starts to apply torque to the wheels 2, 3. The lead motor LM and the follow motor FM form a first electric motor device M1 which serves as the ground drive. By dividing the ground drive into the lead motor LM and the follow motor FM, the first electric motor device M1 and or a second electric motor device M2 can be operated in a more efficient range. The second electric motor device M2 is formed by an electric pump motor PM driving a hydraulic pump. The second electric motor device M2 is responsible for actuating a bucket 4 as a front attachment of the battery wheel loader 1 via a hydraulic pump and a hydraulic actuator (both not shown). The first and the second electric motor devices M1, M2 are powered by a battery system B.

The positions of the motors M1, M2, LM, FM, PM and of the battery system B in the battery wheel loader 1 of FIG. 1 are only shown for increasing the understanding for the present disclosure. Their arrangement may therefore deviate from FIG. 1. The motors M1, M2, LM, FM, PM and the battery system B are part of a current sharing system 100 shown in FIG. 2.

Figure 2:
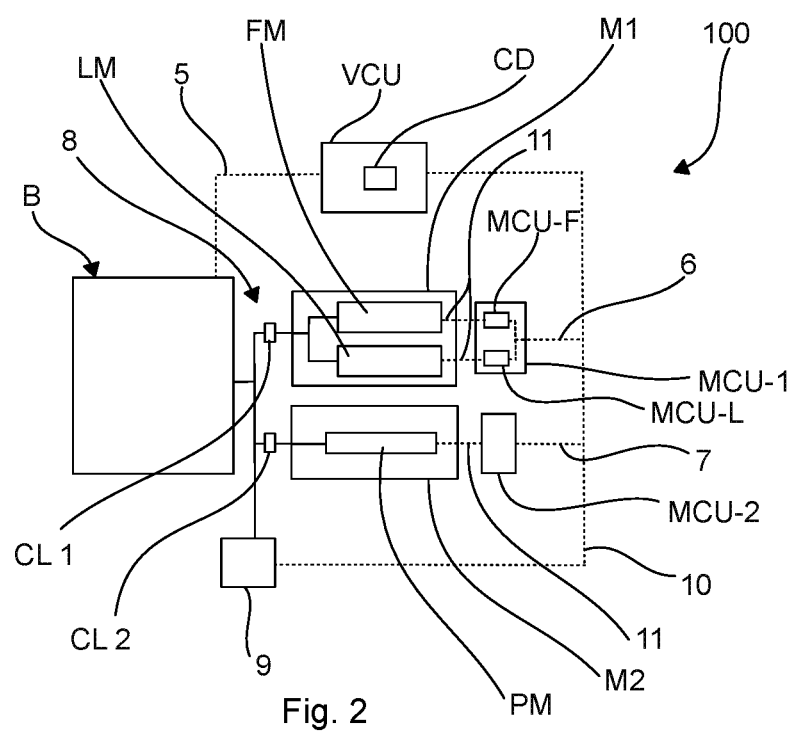
FIG. 2 shows a current sharing system of the wheel loader of FIG. 1 according to an embodiment of the present invention.

FIG. 2 shows the current sharing system 100 according to the present invention. A vehicle control unit VCU forms the center of the current sharing system 100. It communicates with the battery system B via a battery connecting line 5. The VCU further communicates with the first electric motor device M1 via a first motor connecting line 6 and with the second electric motor device M2 via a second motor connecting line 7. The battery system B communicates with the first electric motor device M1 and the second electric motor device M2 via a power distribution bus 8. In addition to the two motor devices M1, M2, the power distribution bus 8 has a parasitic current consumer 9 as one component. Said parasitic current consumer 9 may comprise auxiliary equipment, such as a compressor for an air condition or a DC-DC converter. The parasitic current consumer 9 communicates with the VCU via a parasitic current consumer line 10.

Between the first electric motor device M1 and the VCU, a first motor control unit MCU-1 serves as connecting element. The first motor control unit MCU-1 converts the signals sent to and received from the first motor device M1. Likewise, between the second electric motor device M2 and the VCU, a second motor control unit MCU-2 serves as connecting element. The second motor control unit MCU-2 converts the signals sent to and received from the second motor device M2. The first electric motor device M1 comprises the lead motor LM and the follow motor FM. The lead motor LM is equipped with a lead motor control unit MCU-L and the follow motor FM is equipped with a follow motor control unit MCU-F. The lead motor control unit MCU-L and the follow motor control unit MCU-F form the first motor control unit MCU-1. In another embodiment, however, the three motor control units MCU-1, MCU-L and MCU-F may be formed as three independent components. Each motor control unit MCU-L, MCU-F, MCU-2 communicates with the respective electric motor via a controlling line 11. In the VCU, a control device CD is provided, which is configured to carry out the method according to this invention and to send the respective commands to the current sharing system's 100 consumers M1, M2, 9.

The method which is run on the control device CD will be described in detail with reference to FIGS. 3 to 6.

Figure 3:
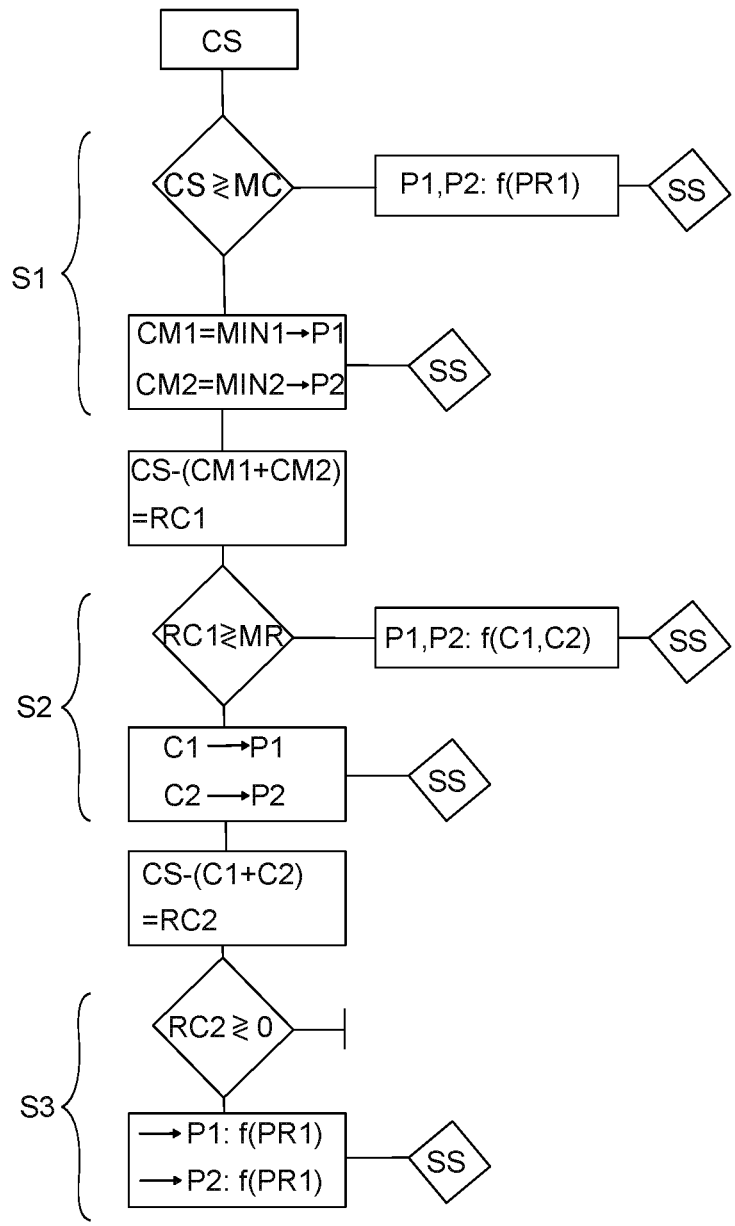
FIG. 3 shows a flow diagram of splitting with the current sharing system of FIG. 2 according to the present invention.

FIG. 3 shows the routine of splitting S in a flow diagram. Before said routine is performed, in the beginning, absolute maximum current limits for the power distribution bus 8 which shall not be exceeded are set. For instance, the electric pump motor PM is set to 350 Amps, the lead motor and the follow motor are set to 600 Amps. The circuit of the lead motor LM and the follow motor FM is limited by a first current limiter CL1. The circuit of the pump motor PM is limited by a second current limiter CL2. Then, the method calculates the parasitic current used by the current sharing system 100. The parasitic current is calculated from measured values in the system 100. The parasitic current is therefore not estimated based on information stored in the VCU. Next, an i2t algorithm may be used to prevent consumers of the power distribution bus 8 from overheating by the aid of a fuse. Whenever the maximum current is exceeded, the current is limited to the nominal value of the respective consumer which nominal value is preset. After this initializing phase, the actual method for controlling a current distribution between multiple electric motor devices M1, M2 in a current sharing system 100 of an electrically driven construction machine starts.

During a splitting S, the method reads and converts torques T1, T2 commanded to the first and second electric motor devices M1, M2 and measures speeds V1, V2 of the respective motors M1, M2 to properly scaled values. Then the method estimates a first current demand C1 and a second current demand C2. Said estimations can be performed on the basis of the torques T1, T2, the speeds V1, V2 as well as the battery's voltage. Now the method can determine the amount of current CS available in the current sharing system 100. The available amount of current CS may be the maximum amount of current available for discharge from the battery system B plus any estimated regenerated current from the motors M1, M2. Estimated regenerated current may be limited to 80% efficiency.

In one exemplary embodiment, the method then presets a predetermined first minimum current MIN1 for the first electric motor device M1 to 20 Amps and a second minimum current MIN2 for the second electric motor device M2 to 10 Amps. Thus, a predetermined minimum amount of current MC equals 30 Amps, the sum of the predetermined first minimum current MIN1 and the second minimum current MIN2. In case these 30 Amps are not available in the available amount of current CS, whatever is available is split among the motors M1, M2 as first portion P1 and second portion P2 in a first predetermined ration PR1 during a first step S1. Said first predetermined ration PR1 may be 2:1, i.e. ⅔ of the available amount of current CS is assigned to the first electric motor device M1 as the first portion P1, ⅓ is assigned to the second electric motor device M2 as the second portion P2. These outputs are limited by the limits in the power distribution bus 8 set earlier.

A first remaining current RC1 is then calculated and the required current for each electric motor device M1, M2 is reduced by the amount which was just assigned to them in order to receive a total amount of demanded current remaining MR after the first step S1. If available, the currents which are required in order to feed the current demands C1, C2 are then simultaneously added to each electric motor device M1, M2 in a second step S2—

In other words, the available amount of current CS is split into a first portion P1 and a second portion P2 based on estimated current demands C1, C2. It shall be noted that the present disclosure covers both alternatives: The currents C1, C2 are added in a one-step method, i.e. as a whole, to the respective electric motor devices M1, M2 as well as the currents C1, C2 are added in a two-stage method, i.e. first their minimum is added and then the remaining current is added. Also, the assigned current can still be limited by the maximum limits calculated earlier.

It is possible that after the second step S2, i.e. even when the first portion P1 equals the first current demand C1 and the second portion P2 equals the second current demand P2, there is a second remaining current RC2 left in the current sharing system 100. The second remaining current RC2 is then split up equally to each electric motor device M1, M2 in the first predetermined ratio PR1 in a third step S3. According to the present disclosure, the current can still be limited by the maximum limits calculated earlier. Thus, it is also possible to get to this point and still have current available. If one of the motors M1, M2 is limited and does therefore not receive the assigned portion P1, P2, its excess current is given to the motor M2, M1 up to the other motor's M2, M1 maximum limit.

After said splitting S, a sub-splitting SS may be performed. During the sub-splitting SS, the first portion P1 for the first electric motor device M1, e.g. the ground drive current, is sub-split between the two ground drive motors LM, FM. First, the predetermined first minimum current MIN1 is sub-split into a lead current minimum demand LCM and a follow current minimum demand FCM of 10 Amps for each motor LM, FM in a first sub-step SS1. If 20 Amps is not available as predetermined first minimum current MIN1, the available current is split equally between the two motors LM, FM in a second predetermined ration PR2 of preferably 1:1. After the first sub-step SS1, in a second sub-step SS2, the lead motor is given all the current it is estimated to require, i.e. the lead portion LP is filled up with the amount of current available. Any excess current is then sent to the follow motor FM up to its estimated requirement, i.e. the follow portion FP, in a third sub-step SS3. If there is an excess current available at this point, it is split between the two motors LM, FM in the second predetermined ration PR2 in a fourth sub-step SS4.

Referring to FIG. 3, the available amount of current CS serves as the input. In the first step S1, the method determines whether the available amount of current CS exceeds the predetermined minimum amount of current MC. If not, the available amount of current CS is assigned to the first and the second portions P1, P2 in accordance with the first predetermined ratio PR1, i.e. as a function of PR1. Then, the sub-splitting SS of the first portion P1 which is described in detail in FIG. 4 will be performed. If the available amount of current CS exceeds the predetermined minimum amount of current MC, an amount of current CM1 which equals the predetermined first minimum current MIN1 is assigned to the first portion P1 and an amount of current CM2 which equals a second minimum current MIN2 is assigned to the second portion P2. As mentioned above, the minimum currents MIN1, MIN2 are preset values which take the motors' properties into account. Then, the sub-splitting SS of the first portion P1 will be performed. After said first step S1, the first remaining current RC1 is known.

In the second step S2, the method determines whether the first remaining current RC1 exceeds the total amount of demanded current remaining MR after the first step S1. If not, the first remaining current RC1 is assigned to the first and the second portions P1, P2 in accordance with their actual, relative current demand, i.e. as a function of the first current demand C1 and the second current demand C2 and their relation to one another. For instance, if the available amount of current CS is 50 Amps and the first current demand C1 is 60 Amps and the second current demand C2 is 40 Amps, then, at first, the respective minimum currents MIN1, MIN2, i.e. 20 Amps and 10 Amps, are given to the electric motor devices M1, M2 in the first step S1. Then, the first motor device M1 demands another 40 Amps and the second electric motor device demands another 30 Amps, i.e. in total further 70 Amps are demanded. However, only 20 Amps are available. In the second step S2, in such a situation, the first electric motor device M1 receives 60% of the 20 Amps and the second electric motor device M1 receives 40% of the 20 Amps. Then, the sub-splitting SS of the first portion P1 will be performed. If the first remaining current RC1 exceeds the total amount of demanded current remaining MR after the first step S1, however, the first portion P1 will be filled up until the first current demand C1 is reached and, parallelly, the second portion P2 will be filled up until the second current demand C2 is reached. This can be applied to the previous example, if it assumed that the available amount of current CS is 100 Amps. In such a case, both electric motor devices M1, M2 receive their demanded currents C1, C2. Then, the sub-splitting SS of the first portion P1 which is described in detail in FIG. 4 will be performed. After said second step S2, the second remaining current RC2 is known.

In the third step S3, the method determines whether the second remaining current RC2 exceeds zero. If not, the method has come to an end here and, preferably, restarts with estimating the current demands C1, C2 which might have changed and then performing the first step S1. If the first remaining current RC2 exceeds zero after the second step S2, further current will be assigned to the first portion P1 and the second portion P2 in accordance with the first predetermined ratio PR1, i.e. as a function of PR1. Then, the sub-splitting SS of the first portion P1 will be performed.

Figure 4:
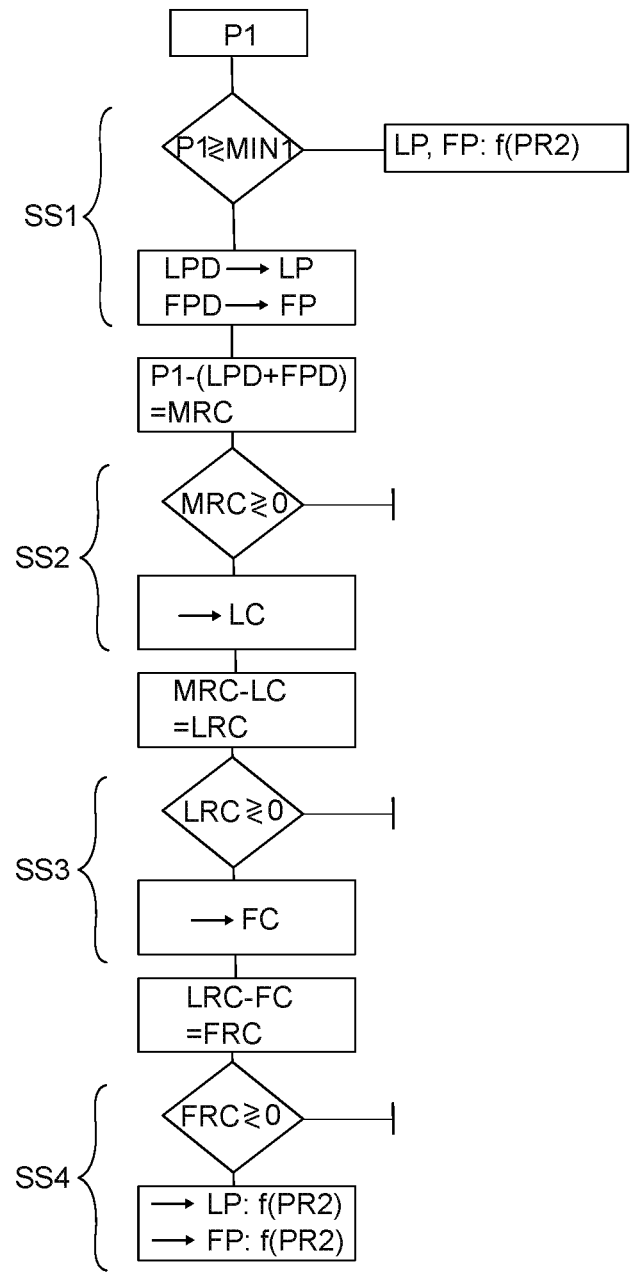
FIG. 4 shows a flow diagram of sub-splitting with the current sharing system of FIG. 2 according to the present invention.

FIG. 4 shows the routine of sub-splitting SS in a flow diagram. The first portion P1 serves as the input, as described in conjunction with FIG. 3. In the first sub-step SS1, the method determines whether the first portion exceeds the predetermined first minimum current MIN1. If not, the first portion is assigned to the lead portion LP and the follow portion FP in accordance with the second predetermined ratio PR2, i.e. as a function of PR2. If the first portion P1 exceeds the predetermined first minimum current MIN1, a lead current minimum demand LCD is assigned to the lead portion LP and a follow portion minimum demand FCD is assigned to the follow portion FP. After said first sub-step SS1, a minimum remaining current MRC is known.

In the second sub-step SS2, the method determines whether the minimum remaining current MRC exceeds zero. If not, the sub-splitting SS has come to an end here. If the minimum remaining current MRC exceeds zero, the lead portion LP will be filled up until the lead current demand LC is reached regardless of whether the follow portion demand FC is reached. After said second sub-step SS2, a lead remaining current LRC is known.

In the third sub-step SS3, the method determines whether the lead remaining current LRC exceeds zero. If not, the sub-splitting SS has come to an end here. If the lead remaining current LRC exceeds zero, the follow portion FP will be filled up until the follow current demand FC is reached. After said third sub-step SS3, a follow remaining current FRC is known.

In the fourth sub-step SS4, the method determines whether the follow remaining current FRC exceeds zero. If not, the method has come to an end here. If the follow remaining current FRC exceeds zero after the third sub-step SS2, further current will be assigned to the lead portion LP and the follow portion FP in accordance with the second predetermined ratio PR2, i.e. as a function of PR2. Then, the sub-splitting SS and with it the entire method has come to an end and, preferably, restarts.

Figure 5:
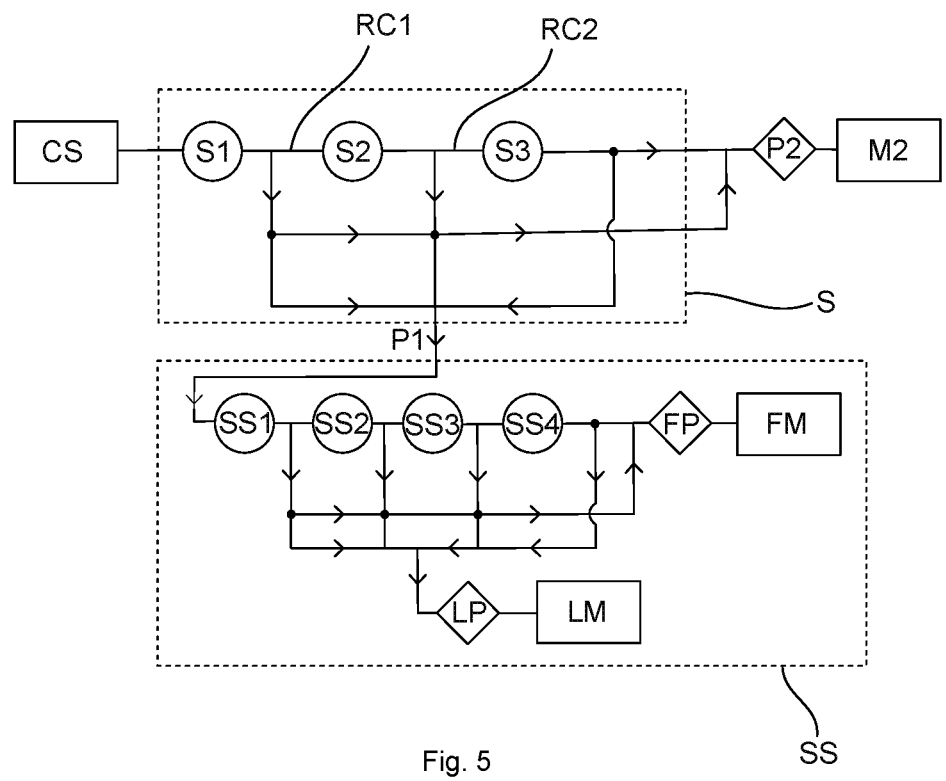
FIG. 5 shows a schematic diagram of a current distribution according to the present invention.

FIG. 5 shows a schematic diagram of a current distribution according to an aspect of the present disclosure. The splitting S is shown compared to the sub-slitting SS. The available amount of current CS serves as the input for the splitting S. After each step in the splitting S, i.e. the first step S1, the second step S2, and the third step S3, a determination is performed as disclosed in detail in conjunction with FIG. 3. By the end of the splitting S, the first portion P1 and the second portion P2 are known. Hence, the output of the splitting S is the first portion P1 and the second portion P2 which runs the second electric motor device M2. The first portion P1 is sub-split as it serves as the input for the sub-splitting SS. After each step in the sub-splitting SS, i.e. the first sub-step SS1, the second sub-step SS2, the third sub-step SS3, and the fourth sub-step SS4, a determination is performed as disclosed in detail in conjunction with FIG. 4. By the end of the sub-splitting SS, the lead portion LP which runs the lead motor LM and the follow portion FP which runs the follow motor are known.

Figure 6:
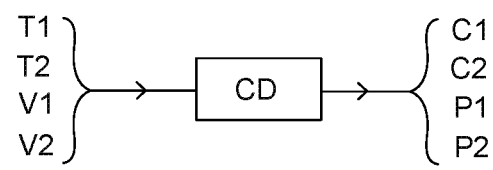
FIG. 6 shows input parameters and output parameters of a control device according to the present invention.

FIG. 6 shows the input parameters and the output parameters of the control device CD according to an aspect of the present disclosure. The control device CD receives the torques T1, T2 commanded to the first electric motor device M1 and the second electric motor device M2. The control device further receives the speeds V1, V2 measured at the first electric motor device M1 and the second electric motor device M2. Mainly based on these time varying parameters, the control device CD estimates the current demands C1, C2 and thus assigns the respective current portions P1, P2 according to the presently disclosed method. As the control device CD forms part of the VCU, cf. FIG. 2, it is interlinked with many other components of the current sharing system 100. For the sake of simplicity, however, FIG. 6 only shows the parameters for estimating the current demands C1, C2.

The invention claimed is:

1. A method for controlling a current distribution between multiple electric motor devices in a current sharing system of an electrically driven construction machine, the method comprising:
    estimating a first current demand for a first electric motor device powered by a battery system and estimating a second current demand for a second electric motor device powered by the battery system;
    determining an available amount of current in the current sharing system;
    splitting the available amount of current into a first portion for driving the first electric motor device and a second portion for driving the second electric motor device, wherein splitting the available amount of current into the first portion and the second portion is based on the estimation of the first current demand and the estimation of the second current demand;
    receiving a first torque command commanded to the first electric motor device and a second torque command commanded to the second electric motor device; and
    measuring a first speed of the first electric motor device and a second speed of the second electric motor device, wherein the estimation of the first current demand is based on the first torque command and the first speed, and wherein the estimation of the second current demand is based on the second torque command and the second speed.

2. The method according to claim 1 wherein splitting the available amount of current into the first portion and the second portion comprises a first step that includes determining whether the available amount of current is greater than, equal to, or less than a predetermined minimum amount of current, and wherein a result of the determination is used for further splitting.

3. The method according to claim 2, comprising:
    when the available amount of current is less than the predetermined minimum amount of current, in the first step, splitting the available amount of current into the first portion and the second portion in a first predetermined ratio 2 to 1; and when the available amount of current is greater than or equal to the predetermined minimum amount of current, in the first step, assigning an amount of current, which equals a predetermined first minimum current, to the first portion and another amount of current, which equals a predetermined second minimum current, to the second portion.

4. The method according to claim 3, wherein splitting the available amount of current into the first portion and the second portion comprises a second step that includes determining whether a first remaining current of the available amount of current remaining after the first step is greater than, equal to, or less than a total amount of demanded current remaining after the first step, wherein the result of the determination is used for further splitting.

5. The method according to claim 4, comprising:
when the first remaining current of the available amount of current is less than the total amount of demanded current remaining after the first step, in the second step, splitting the first remaining current of the available amount of current into the first portion and the second portion in a ratio equaling the ratio of the first current demand to the second current demand; and
when the first remaining current of the available amount of current is greater than or equal to the total amount of demanded current remaining after the first step, in the second step, assigning a first current to the first portion up to the first current demand and a second current to the second portion up to the second current demand.

6. The method according to claim 4, wherein
splitting the available amount of current into the first portion and the second portion comprises a third step that includes determining whether after the second step, a second remaining current of the available amount of current remaining after the second step is greater than zero; and
wherein the method comprises, when the second remaining current of the available amount of current is greater than zero, in the third step, splitting the second remaining current of the available amount of current into the first portion and the second portion in the first predetermined ratio.

7. The method according to claim 3 comprising:
estimating a lead current demand for a lead motor, which forms part of the first electric motor device;
estimating a follow current demand for a follow motor, which forms part of the first electric motor device;
receiving the amount of current of the first portion; and
sub-splitting, based on the estimations of the lead current demand and the follow current demand, the first portion into a lead portion for driving the lead motor and a follow portion for driving the follow motor.

8. The method according to claim 7, wherein sub-splitting the first portion into the lead portion and the follow portion comprises a first sub-step that includes determining whether the first portion is greater than, equal to, or less than the predetermined first minimum current; and
wherein the method comprises:
when the first portion is less than the predetermined first minimum current, in the first sub-step, splitting the first portion into the lead current and the follow current in a second predetermined ratio of 1 to 1; and
when the first portion is greater than or equal to the predetermined first minimum current, in the first sub-step, assigning a lead current minimum demand to the lead portion and a follow current minimum demand to the follow portion, wherein the lead current minimum demand is equal to the follow current minimum demand.

9. The method according to claim 8, wherein sub-splitting the first portion into the lead portion and the follow portion comprises a second sub-step that includes determining whether a minimum remaining current of the first portion remaining after the first sub-step is greater than zero; and
wherein the method comprises, when the minimum remaining current of the first portion is greater than zero, assigning a portion of the minimum remaining current of the first portion to the lead portion until the lead current demand is reached.

10. The method according to claim 9, wherein the-sub-splitting the first portion into the lead portion and the follow portion comprises a third sub-step that includes determining whether a lead remaining current remaining after the second sub-step is greater than zero; and
wherein the method comprises, when the lead remaining current is greater than zero, assigning a portion of the lead remaining current to the follow portion until the follow current demand is reached.

11. The method according to claim 1, wherein estimating the first current demand, estimating the second current demand, determining the available amount of current in the current sharing system, and splitting of the available amount of current into the first portion and the second portion are carried out between 80 and 100 times per second.

12. The method according to claim 1, wherein the available amount of current in the current sharing system equals a maximum amount of current available for discharge from the battery system plus an estimated regenerated current from at least one of the first electric motor device or the second electric motor device.

13. A control device for controlling a current distribution in a current sharing system of an electrically driven construction vehicle, wherein the control device is configured to:
estimate a first current demand for a first electric motor device powered by a battery system and estimate a second current demand for a second electric motor device powered by the battery system;
determine an available amount of current in the current sharing system;
split the available amount of current into a first portion for driving the first electric motor device and a second portion for driving the second electric motor device, wherein the split is based on the estimation of the first current demand and the estimation of the second current demand;
receive a first torque command commanded to the first electric motor device and a second torque command commanded to the second electric motor device; and
measure a first speed of the first electric motor device and a second speed of the second electric motor device, wherein the estimation of the first current demand is based on the first torque command and the first speed, and wherein the estimation of the second current demand is based on the second torque command and the second speed.

14. The control device according to claim 13, wherein the control device is configured to determine whether the available amount of current is greater than, equal to, or less than a predetermined minimum amount of current, and wherein a result of the determination is used to further split the available amount of current.

15. The control device according to claim 14, wherein the control device is configured to:

when the available amount of current is less than the predetermined minimum amount of current, split the available amount of current into the first portion and the second portion in a first predetermined ratio of 2 to 1; and when the available amount of current is greater than or equal to the predetermined minimum amount of current, assign an amount of current, which equals a predetermined first minimum current, to the first portion and another amount of current, which equals a predetermined second minimum current, to the second portion.

16. A current sharing system for an electrically driven construction machine, comprising:
   a battery system including at least one battery;
   a first electric motor device comprising a lead motor and a follow motor;
   a first motor control unit operatively connected to the first electric motor device, wherein the first motor control unit comprises a lead motor control unit and a follow motor control unit;
   a second electric motor device including an electric pump motor for a hydraulic pump;
   a second motor control unit operatively connected to the second electric motor device; and
   a vehicle control unit comprising a control device, wherein the control device is operatively connected to the battery system, the first motor control unit, and the second motor control unit, and wherein the control device is configured to:
   estimate a first current demand for a first electric motor device powered by a battery system and estimate a second current demand for a second electric motor device powered by the battery system;
   determine an available amount of current in the current sharing system;
   split the available amount of current into a first portion for driving the first electric motor device and a second portion for driving the second electric motor device,
   wherein the split is based on the estimation of the first current demand and the estimation of the second current demand;
   receive a first torque command commanded to the first electric motor device and a second torque command commanded to the second electric motor device; and
   measure a first speed of the first electric motor device and a second speed of the second electric motor device, wherein the estimation of the first current demand is based on the first torque command and the first speed, and wherein the estimation of the second current demand is based on the second torque command and the second speed.

17. The current sharing system according to claim 16, wherein the control device is configured to determine whether the available amount of current is greater than, equal to, or less than a predetermined minimum amount of current, and wherein a result of the determination is used to further split the available amount of current.

* * * * *